(12) United States Patent
Lugade et al.

(10) Patent No.: US 8,088,629 B1
(45) Date of Patent: Jan. 3, 2012

(54) METHODS FOR FORMING DYED MICROSPHERES AND POPULATIONS OF MICROSPHERES

(75) Inventors: Ananda G. Lugade, Austin, TX (US);
Kurt D. Hoffacker, Austin, TX (US)

(73) Assignee: Luminex Corporation, Austin, TX (US)

( * ) Notice: Subject to any disclaimer, the term of this patent is extended or adjusted under 35 U.S.C. 154(b) by 1072 days.

(21) Appl. No.: 11/248,039

(22) Filed: Oct. 12, 2005

Related U.S. Application Data

(60) Provisional application No. 60/618,339, filed on Oct. 12, 2004.

(51) Int. Cl.
*C08L 101/00* (2006.01)
*C09K 3/00* (2006.01)
(52) U.S. Cl. ........ 436/174; 436/168; 436/178; 106/409; 106/408; 106/287.35; 106/424; 106/429
(58) Field of Classification Search .................. 436/174, 436/168, 178; 106/287.35, 424, 408, 429
See application file for complete search history.

(56) References Cited

U.S. PATENT DOCUMENTS

| | | | |
|---|---|---|---|
| 4,868,126 A * | 9/1989 | Schwartz | .................... 436/10 |
| 5,093,234 A | 3/1992 | Schwartz et al. | |
| 5,414,135 A | 5/1995 | Snow et al. | |
| 5,578,119 A * | 11/1996 | Short et al. | ............... 106/287.35 |
| 5,981,180 A | 11/1999 | Chandler et al. | |
| 6,046,807 A | 4/2000 | Chandler | |
| 6,139,800 A | 10/2000 | Chandler | |
| 6,366,354 B1 | 4/2002 | Chandler | |
| 6,411,904 B1 | 6/2002 | Chandler | |
| 6,449,562 B1 | 9/2002 | Chandler et al. | |
| 6,514,295 B1 | 2/2003 | Chandler et al. | |
| 6,524,793 B1 | 2/2003 | Chandler et al. | |
| 6,599,331 B2 | 7/2003 | Chandler et al. | |
| 2004/0039201 A1 | 2/2004 | Lugade et al. | |

OTHER PUBLICATIONS

Zutatas, V. Affinity partitioning of enzymes in aqueous two-phase systems containing dyes and their copper(2) complexes bound to polyethylene glycol.(1992). journal of Chromatography.606:1.(55-64).*

Yates et al., "Colored Polymer Microparticles through Carbon Dioxide-Assisted Dyeing," Langmuir, vol. 16, No. 11, May 2000, pp. 4757-4760.

Yamasaki et al., "New PEG2 type polyethylene glycol derivatives for protein modification," Biotechnology Techniques, vol. 12, No. 10, Oct. 1998, pp. 751-754.

(Continued)

*Primary Examiner* — Vickie Kim
*Assistant Examiner* — Rebecca M Fritchman
(74) *Attorney, Agent, or Firm* — Fulbright & Jaworski LLP

(57) ABSTRACT

Various methods for forming dyed microspheres are provided. One method includes attaching a hydrophilic dye to chemical groups to form a bubble. The bubble includes the chemical groups surrounding the hydrophilic dye and an aqueous solution. The chemical groups are soluble in aqueous and organic solvents. The method also includes disposing the bubble and a microsphere to be dyed in a solvent such that the bubble is incorporated into the microsphere thereby dyeing the microsphere. Another method includes adsorbing a hydrophilic dye on a surface of a hydrophobic polymer core of a microsphere to be dyed thereby dyeing the microsphere. The method also includes attaching chemical groups to the hydrophilic dye. The chemical groups are soluble in aqueous and organic solvents. The chemical groups attached to the hydrophilic dye form an enclosure surrounding the hydrophilic dye and an aqueous solution.

21 Claims, 4 Drawing Sheets

OTHER PUBLICATIONS

Roberts et al., "Chemistry for peptide and protein PEGylation," Advanced Drug Delivery Reviews, vol. 54, 2002, pp. 459-476.

Li et al., "Chemical Modification of Surface Active Poly(ethylene oxide)-Poly(propylene oxide) Triblock Copolymers," Bioconjugate Chem., vol. 7, 1996, pp. 592-599.

Han et al., "Quantum-dot-tagged microbeads for multiplexed optical coding of biomolecules," Nature Biotechnology, vol. 19, Jul. 2001, pp. 631-635.

Contreras-Martel et al., "Crystallization and 2.2 Å resolution structure of R-phycoerythrin from Gracilaria chilensis: a case of perfect hemihedral twinning," Acta Crystallographica, vol. D57, 2001, pp. 52-60.

Alakhov et al., "Hypersensitization of Multidrug Resistant Human Ovarian Carcinoma Cells by Pluronic P85 Block Copolymer," Bioconjugate Chem., vol. 7, 1996, pp. 209-216.

Takahashi et al., "Polyethylene Glycol-Modified Enzymes Trap Water on their Surface and Exert Enzymic Activity in Organic Solvents," Biotechnology Letters, vol. 6, No. 12, 1984, pp. 765-770.

Hermanson, Bioconjugate Techniques, Academic Press 1996, pp. 606-618.

Ono et al., "Selective synthesis of 2,4-bis(O-methoxypolyethylene glycol)-6-chloro-s-triazine as a protein modifier," J. Biomater. Sci. Polymer Edn., vol. 2, No. 1, 1991, pp. 61-65.

Schwartz et al., "Formalization of the MESF Unit of Fluorescence Intensity," Clinical Cytometry, vol. 57B, 2004, pp. 1-6.

* cited by examiner

METHODS FOR FORMING DYED MICROSPHERES AND POPULATIONS OF MICROSPHERES

PRIORITY CLAIM

This application claims priority to U.S. Provisional Application No. 60/618,339 entitled "Methods for Forming Dyed Microspheres and Populations of Microspheres," filed Oct. 12, 2004, which is incorporated by reference as if fully set forth herein.

BACKGROUND OF THE INVENTION

1. Field of the Invention

This invention generally relates to methods for forming dyed microspheres and populations of microspheres. Certain embodiments include attaching a hydrophilic dye to chemical groups to form a bubble and disposing the bubble and a microsphere to be dyed in a solvent such that the bubble is incorporated into the microsphere.

2. Description of the Related Art

The following descriptions and examples are not admitted to be prior art by virtue of their inclusion within this section.

Spectroscopic techniques are widely employed in the analysis of chemical and biological systems. Most often, these techniques involve measuring the absorption or emission of electromagnetic radiation by the material of interest. One such application is in the field of microarrays, which is a technology exploited by a large number of disciplines including the combinatorial chemistry and biological assay industries. One company, Luminex Corporation of Austin, Tex., has developed a system in which biological assays are performed on the surface of variously colored fluorescent microspheres. One example of such a system is illustrated in U.S. Pat. No. 5,981,180 to Chandler et al., which is incorporated by reference as if fully set forth herein. In such a fluid flow device, microspheres are interrogated by laser excitation and fluorescence detection of each individual microsphere as it passes at relatively high speed through a detection zone. Measurement data generated by such a system may be easily exported to a database for further analysis.

In the above-mentioned system, fluorescent dyes are absorbed into the microspheres and/or bound to the surface of the microspheres. The dyes are chosen based on their ability to emit light having a wavelength within a detection window of the measurement system. Further, the detection windows of the measurement system are spaced apart by a number of wavelengths, and the dyes are typically designed to minimize the overlap of a dye's fluorescent signal within adjacent detection windows. By employing two detection windows and two dyes, each at 10 different concentrations, there would thus be 100 fluorescently distinguishable microsphere sets.

Since dyes are primarily chosen for their fluorescence characteristics, sometimes dyes that have excellent fluorescent characteristics may be substantially incompatible with the microspheres to which they must be coupled. For example, one widely used dye is phycoerythrin (PE). This dye is hydrophilic. In contrast, the polymers of which microspheres are usually formed are hydrophobic. As such, it may be impossible to incorporate this dye into microspheres with currently used dyeing methods.

For example, one particularly suitable method for incorporating a dye into the polymer of microspheres includes disposing the microspheres in a solvent that causes swelling of the microspheres. When a dye is also disposed in the solvent, the dye will migrate into the polymer core of the microspheres. The dye can then be trapped in the polymer core by de-swelling the microspheres. De-swelling may be caused by changing the solvent.

Typically, the solvent that is used to swell the microspheres is an organic solvent or contains an organic solvent. In this manner, a hydrophilic dye may not be adequately dissolved, dispersed, or suspended in the solution that includes the microspheres and the solvent such that the microspheres can be dyed at all, let alone uniformly. If the hydrophilic dye can be sufficiently forced into the solution, the organic solvent would possibly destroy the hydrophilic dye. Therefore, hydrophilic dyes often cannot be incorporated into the polymer core of microspheres with currently used dye incorporation methods.

Other currently used methods for coupling hydrophilic dyes to the hydrophobic polymer core of microspheres include attaching a hydrophilic dye to an outer surface of the polymer core. Attaching the hydrophilic dye to the outer surface of the polymer core greatly reduces the complexity of the dyeing process. For example, such dyeing procedures can be carried out in aqueous solvents thereby eliminating the problems outlined above.

There are, however, several potential disadvantages to attaching the dye to the outer surface of the polymer core. For example, one or more characteristics of a surface bound dye may be affected by changes in the buffer solution in which the dyed microspheres are disposed, for example, during an assay. Such changes in the one or more characteristics of the dye due to the buffer solution may include changes in brightness (intensity) and color (wavelength). In addition, the shelf stability of a dye attached to the surface of the polymer core of microspheres may be less than the shelf stability of a dye incorporated into the polymer core. For example, if a dye can be incorporated in the polymer core, the dye may be better protected from buffer solutions and other conditions to which the microspheres are exposed. Furthermore, the variation in dyeing results are generally higher for surface attaching of a dye to a microsphere than for polymer core incorporation of the dye. In other words, microspheres that have dyes incorporated into the polymer core generally have a lower % coefficient of variation (% CV). A low % CV is advantageous for a number of reasons known in the art such as more uniform microsphere fluorescence emission characteristics and high microsphere classification accuracy.

Accordingly, it would be advantageous to develop a method for incorporating a hydrophilic dye into a polymer core of a microsphere without destroying the dye or otherwise adversely affecting characteristics of the dye such as intensity and wavelength of fluorescence emission to thereby produce a dyed microsphere having highly stable dye characteristics (e.g., a relatively long shelf life), with relatively high uniformity from microsphere-to-microsphere (or low % CV within microsphere subsets), and without increasing the difficulty or complexity of the actual dyeing process.

SUMMARY OF THE INVENTION

The following description of various methods and dyed microsphere embodiments is not to be construed in any way as limiting the subject matter of the appended claims.

One embodiment relates to a method for forming a dyed microsphere. The method includes attaching a hydrophilic dye to chemical groups to form a bubble. The bubble includes the chemical groups surrounding the hydrophilic dye and an aqueous solution. The chemical groups are soluble in aqueous and organic solvents. The method also includes disposing the bubble and a microsphere to be dyed in a solvent such that the bubble is incorporated into the microsphere thereby dyeing the microsphere.

Although method embodiments are described herein with respect to one microsphere, it is to be understood that the method embodiments may be used to dye multiple microspheres simultaneously (e.g., by disposing multiple microspheres and multiple bubbles in the solvent). In addition, although the methods are described herein with respect to dyeing a microsphere with one hydrophilic dye, it is to be understood that the methods may include dyeing the microsphere with more than one dye substantially simultaneously or sequentially. The dyes may include at least one hydrophilic dye (e.g., more than one hydrophilic dye, one or more hydrophilic dyes and one or more hydrophobic dyes, etc.). Furthermore, at least one hydrophilic dye is incorporated into the microsphere via a bubble, and one or more other dyes may be coupled to the microsphere in any other manner (e.g., an additional hydrophilic dye may be incorporated into the microsphere via a bubble and/or a hydrophobic dye may be attached to the surface of the microsphere in the methods described herein).

In one embodiment, the hydrophilic dye includes phycoerythrin (PE). In another embodiment, the hydrophilic dye includes a fluorescent pigment, a protein, a protein containing dye, or a synthetic hydrophilic dye. In a further embodiment, the hydrophilic dye includes an organic dye. In some embodiments, the hydrophilic dye has a lateral dimension of about 1 nm to about 50 nm. In an embodiment, the chemical groups are polyethylene glycol (PEG) groups. In another embodiment, the chemical groups may be attached to the hydrophilic dye by an additional chemical group. In another embodiment, the pigment or dye is doped into a liposome, which is delivered into the hydrophobic polymeric microsphere. In one embodiment, the aqueous solution consists essentially of water. The microsphere may be formed of a hydrophobic polymer. Each of the embodiments of the method described above may include any other step(s) described herein.

Another embodiment relates to a different method for forming a dyed microsphere. This method includes adsorbing a hydrophilic dye on a surface of a hydrophobic polymer core of a microsphere to be dyed thereby dyeing the microsphere. The method also includes attaching chemical groups to the hydrophilic dye. The chemical groups are soluble in aqueous and organic solvents. The chemical groups attached to the hydrophilic dye form an enclosure surrounding the hydrophilic dye and an aqueous solution.

Although embodiments of this method are described herein with respect to one microsphere, it is to be understood that the method embodiments may be used to dye multiple microspheres simultaneously (e.g., by adsorbing a hydrophilic dye on the surface of multiple microspheres simultaneously, etc.). In addition, although the methods are described herein with respect to dyeing a microsphere with one hydrophilic dye, it is to be understood that the methods may include dyeing the microsphere with more than one dye substantially simultaneously or sequentially. The dyes may include at least one hydrophilic dye (e.g., more than one hydrophilic dye, one or more hydrophilic dyes and one or more hydrophobic dyes, etc.). For example, one hydrophilic dye may be attached to the surface of a hydrophobic polymer core of a microsphere, which is surrounded by chemical groups as described above, and a different hydrophilic dye may be incorporated into the microsphere via a bubble as described further above. In such an example, one or more hydrophilic dyes may be incorporated into the microsphere via bubbles as described herein and/or one or more hydrophobic dyes may be incorporated into the microsphere (possibly at the same time the bubble or bubbles are incorporated into the microsphere). In a different such example, only hydrophobic dye(s) may be incorporated into the microsphere, and one or more hydrophilic dyes are attached to the surface of the hydrophobic polymer core and surrounded by chemical groups that form an enclosure as described herein. Therefore, a number of other different dyes may be coupled to a dyed microsphere formed according to the method embodiments described herein, and the particular combination of dyes coupled to the dyed microsphere may be selected based on, for example, the emission characteristics of the dyes, the experiment in which the microsphere is to be used, and the measurement capability of the system to be used for measurements of the microsphere.

In one embodiment, the hydrophilic dye includes PE. In another embodiment, the hydrophilic dye includes a fluorescent pigment, a protein, a protein containing dye, or a synthetic hydrophilic dye. In a further embodiment, the hydrophilic dye includes an organic dye. In some embodiments, the chemical groups include PEG groups. In another embodiment, the chemical groups are attached to the hydrophilic dye by an additional chemical group. The aqueous solution may consist essentially of water. Each of the embodiments of the method described above may include any other step(s) described herein.

An additional embodiment relates to a dyed microsphere. The dyed microsphere includes chemical groups attached to a hydrophilic dye to form a bubble. The bubble includes the chemical groups surrounding the hydrophilic dye and an aqueous solution. The chemical groups are soluble in aqueous and organic solvents. The bubble is incorporated in a polymer core of the microsphere.

In one embodiment, the hydrophilic dye includes PE. In another embodiment, the hydrophilic dye includes a fluorescent pigment, a protein, a protein containing dye, or a synthetic hydrophilic dye. In a further embodiment, the hydrophilic dye includes an organic dye. In some embodiments, the hydrophilic dye has a lateral dimension of about 1 nm to about 50 nm. In an embodiment, the chemical groups include PEG groups. In another embodiment, the chemical groups are attached to the hydrophilic dye by an additional chemical group. In one embodiment, the aqueous solution consists essentially of water. The microsphere may be formed of a hydrophobic polymer. The dyed microsphere may be further configured, composed, and/or formed as described herein.

A further embodiment relates to a different dyed microsphere. This dyed microsphere includes a hydrophilic dye adsorbed on a surface of a hydrophobic polymer core of the microsphere. The dyed microsphere also includes chemical groups attached to the hydrophilic dye. The chemical groups are soluble in aqueous and organic solvents. The chemical groups attached to the hydrophilic dye form an enclosure surrounding the hydrophilic dye and an aqueous solution.

In one embodiment, the hydrophilic dye includes PE. In another embodiment, the hydrophilic dye includes a fluorescent pigment, a protein, a protein containing dye, or a synthetic hydrophilic dye. In a further embodiment, the hydrophilic dye includes an organic dye. In some embodiments, the chemical groups include PEG groups. The chemical groups may also be attached to the hydrophilic dye by an additional chemical group. The aqueous solution may consist essentially of water. The dyed microsphere may be further configured, composed, and/or formed as described herein.

BRIEF DESCRIPTION OF THE DRAWINGS

Other objects and advantages of the invention will become apparent upon reading the following detailed description and upon reference to the accompanying drawings in which.

Figure 1:
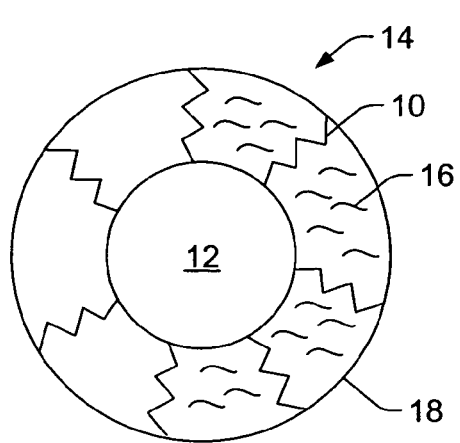
FIGS. 1-2 are schematic diagrams illustrating a cross-sectional view of various embodiments of a bubble that includes chemical groups surrounding a hydrophilic dye and an aqueous solution.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Although method and dyed microsphere embodiments are described herein with respect to fluorescent dyes, it is to be understood that the methods and dyed microspheres described herein can be used with or include any other hydrophilic molecule(s) known in the art (e.g., fluorophores) that can be used to impart one or more measurable, distinguishing characteristics to the microspheres. Furthermore, many different hydrophilic dyes are known in the art, and the term "hydrophilic dye" as used herein is intended to encompass all hydrophilic dyes known in the art.

Although embodiments are described herein with respect to microspheres, it is to be understood that the embodiments can be used to dye or include any discrete substances (e.g., microspheres, beads, particles, nanotubes, etc.) known in the art that are formed of a material in which a bubble as described herein can be incorporated into, having a surface on which a hydrophilic dye can be adsorbed, or having a surface that can be modified such that a hydrophilic dye can be adsorbed thereon. The terms "microspheres" and "beads" are used interchangeably herein.

As used herein, the term "biomolecules" is used to refer to any molecules known in the art that are involved in or related to biological functioning of one or more organisms. Examples of such biomolecules include, but are not limited to, nucleotides, oligonucleotides, proteins, enzymes, antigens, and antibodies. Many different biomolecules may be utilized in an assay or other similar experiment, and the term "biomolecules" as used herein is intended to encompass all such biomolecules known in the art.

Phycoerythrin (PE) dye is a 240 k Dalton water-soluble protein that is widely used as a reporter dye. Because this dye is hydrophilic, it would be impossible to force the dye inside the hydrophobic interiors (i.e., hydrophobic polymer cores) of microspheres using currently used dyeing processes. In fact, most standard dyeing solvents used in dyeing processes such as organic solvents would probably destroy the dye.

It is known that enzymes that are normally inactive in organic solvents (such as benzene) can be rendered functional by coating the enzymes with amphiphilic polyethylene glycol (PEG) groups. PEG groups are soluble in water, other aqueous solvents, and organic solvents (e.g., polar and non-polar solvents). When coated on the surface of an enzyme, PEG group containing molecules form a protective enclosure around the enzyme that retains enough water near the protein to stabilize the protein even if the coated protein is dispersed into an organic solvent. In this manner, PEG-coated enzymes dispersed in organic solvent retain at least a portion of their activity.

Examples of methods for using PEG with proteins are illustrated in "Polyethylene glycol-modified enzymes trap water on their surface and exert enzymatic activity in organic solvents," Takahashi, K. et al., *Biotechnology Letters,* 1984, 6(12), pp. 765-770, which is incorporated by reference as if fully set forth herein. However, PEG groups have not been used to modify organic hydrophilic dyes (e.g., fluorescein or rhodamine) in order to enable incorporation of the hydrophilic dyes into hydrophobic polymeric matrices without destruction of the hydrophilic dyes or alteration of the emission characteristics of the hydrophilic dyes.

One embodiment of a method for forming a dyed microsphere includes attaching a hydrophilic dye to chemical groups to form a bubble. The bubble includes the chemical groups surrounding the hydrophilic dye and an aqueous solution. The chemical groups are soluble in aqueous and organic solvents. In other words, the chemical groups are amphipathic molecules or amphiphilic molecules. The method also includes disposing the bubble and a microsphere to be dyed in a solvent such that the bubble is incorporated into the microsphere thereby dyeing the microsphere. Although the method is described above with respect to incorporating a bubble into a microsphere, it is to be understood that the method may include incorporating multiple bubbles into the microsphere substantially simultaneously (e.g., in one dyeing step) as described further herein.

The term "bubble" as used herein refers to a composite structure formed of distinct components including chemical groups, dye, and aqueous solution. A "bubble" may as the connotation suggests have a generally spherical shape. However, a "bubble" as described herein may have any shape, which may vary depending on, for example, how the dye is attached to the chemical groups and the structures of the dye and the chemical groups. In addition, a bubble as described herein is not hollow, but instead contains at least a hydrophilic dye and an aqueous solution.

FIG. 1 illustrates one embodiment of a bubble that includes chemical groups surrounding a hydrophilic dye and an aqueous solution. FIG. 1 (like other figures presented herein) is not drawn to scale. In addition, FIG. 1 is not drawn to the same scale as other figures presented herein. Elements shown in more than one figure that may be similarly configured have been indicated using the same reference numerals. Furthermore, the figures presented herein are merely schematic diagrams meant to generally illustrate various features of the embodiments to promote understanding of the embodiments. As such, it is to be understood that elements shown in the figures are not meant to convey any particular structural characteristics (physical or chemical), any particular dimensions (lateral or otherwise), or any particular shape (spherical or otherwise).

As shown in FIG. 1, chemical groups 10 attached to hydrophilic dye 12 form bubble 14. Hydrophilic dye 12 shown in FIG. 1 may include one dye molecule. Alternatively, hydrophilic dye 12 shown in FIG. 1 may contain multiple dye molecules. The dye molecules may include more than one molecule of the same dye or molecules of two or more different dyes. The hydrophilic dye may be PE or any other suitable hydrophilic dye described herein or known in the art. For example, PE is not the only hydrophilic molecule that could be entrapped inside the polymer core of microspheres via a bubble using the methods described herein. Other hydrophilic protein dyes (green fluorescence protein, Allophycocyanin (APC), etc.) and hydrophilic organic dyes (cyanine, rhodamine, etc.) could also be used in the method embodiments described herein. In fact, any hydrophilic molecule that can be attached to PEG chains or other appropriate amphiphilic chemical groups may be incorporated in a microsphere as described herein.

Although a certain number of chemical groups are shown attached to hydrophilic dye 12 in FIG. 1, it is to be understood that the number of chemical groups that are attached to the dye may vary greatly and may depend on, for example, the number of amine groups or other structures in the dye to which the chemical groups may attach. Bubble 14 includes chemical groups 10 surrounding hydrophilic dye 12 and aqueous solution 16. The bubble may also be formed without any covalent attachment of the chemical groups. A stable liposome may be formed and isolated (using techniques known in the art) with the hydrophilic dye in the aqueous interior. Although the chemical groups surrounding hydrophilic dye 12 are shown in FIG. 1 to form substantially continuous enclosure 18 surrounding the hydrophilic dye, it is to be understood that the enclosure formed by the chemical groups may not actually be substantially continuous. The enclosure is preferably sufficiently continuous to contain at least some aqueous solution within the bubble proximate to the dye.

The chemical groups may include PEG groups. In an additional embodiment shown in FIG. 2, the chemical groups may be attached to the hydrophilic dye by one or more additional chemical groups 19 such as triazine as described below. The bubble shown in FIG. 2 may be further configured as described herein. Other amphiphilic polymers can also be used as the chemical groups in the methods described herein (e.g., polyethyleneimine, poly(ethylene oxide) (PEO), poly(propylene oxide) (PPO), Triton-X surfactant, etc.) Amphiphilic polymers can be generally defined as any polymer that has a hydrophilic portion (a polar portion) and a hydrophobic portion (a non-polar portion). Additional examples of amphiphilic polymers suitable for use in the methods described herein are listed in U.S. Patent Application Publication No. 2004/0039201 to Lugade et al., which is incorporated by reference as if fully set forth herein. The chemical groups described herein may include any of the amphiphilic polymers described in this patent application.

The aqueous solution may consist essentially of water. In this manner, the aqueous solution may consist essentially of one component. However, the aqueous solution may also include water and/or any other suitable components known in the art. As such, the aqueous solution may include one or more different components. Preferably, the aqueous solution is substantially inert with respect to the hydrophilic dye. In other words, exposure of the dye to the aqueous solution preferably does not alter one or more characteristics of the dye (e.g., intensity and/or wavelength of fluorescence emission) or alter the structure of the dye (e.g., by decomposition or other reaction mechanisms). The aqueous solution may be the same solution in which attaching the chemical groups to the hydrophilic dye is performed. Alternatively, the aqueous solution may be introduced to the bubble after attachment of the chemical groups to the dye.

Examples of methods for coupling chemical groups to proteins are illustrated in "Protein modification with activated polyethylene glycols," Hermanson, G. T., *Bioconjugate Techniques, Academic Press,* 1996, Chapter 15.1, pp. 606-618, U.S. Pat. No. 5,414,135 to Snow et al., "Selective synthesis of 2,4-bis(O-methoxy-polyethylene glycol)-6-chloro-s-triazine as a protein modifier," Ono, K. et al., *Journal of Biomaterials Science,* Polymer Ed., 1991, 2(1), pp. 61-65, and "New PEG2 type polyethylene glycol derivatives for protein modification," Yamasaki, M. et al., *Biotechnology Techniques,* 1998, 12, pp. 751-754, which are incorporated by reference as if fully set forth herein.

A detailed procedure for attaching PEG groups to proteins is illustrated in the article by Hermanson, G. T. in *Bioconjugate Techniques*, which is referenced above. The procedure is illustrated in the reaction below in which attachment of monomethyl PEG (m-PEG) groups to protein (R—NH$_2$) is accomplished via trichloro-s-triazine (TsT).

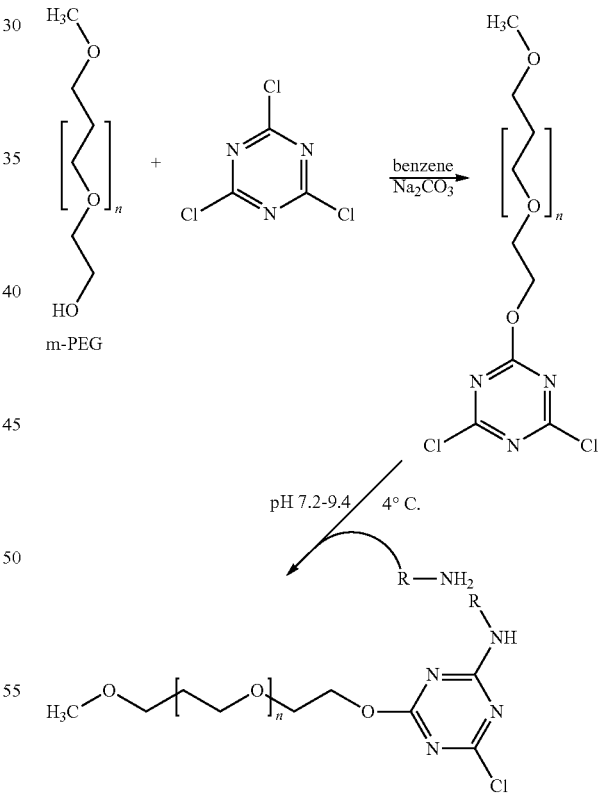

In the first step of the procedure shown above, the m-PEG molecule (molecular weight (MW) 5000) is reacted with TsT in organic solvent (benzene) and then purified by crystallization. In the second step of the procedure shown above, the TsT activated m-PEG is reacted in large excess with the protein in cold buffer. The modified protein is then isolated by dialysis or gel filtration.

A similar procedure using divinylsulfone as the linking reagent is described in U.S. Pat. No. 5,414,135 to Snow et al., which is incorporated by reference as if fully set forth herein. In this procedure, m-PEG is reacted with divinylsulfone in hot tetrahydrofuran (THF). The adduct was then reacted with various proteins (enzymes) in buffer.

In one embodiment, a method for attaching two PEG groups to each protein amino group includes reacting one of the di-PEG group containing molecules shown below (MW about 10,000) with PE in a solution containing PE and an aqueous solvent.

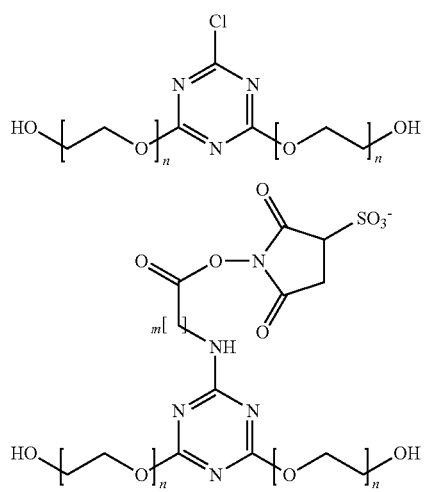

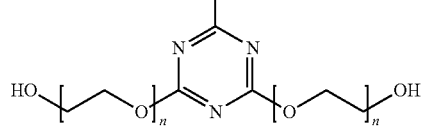

The PEG group containing molecules will react with amino groups on the surface of the PE molecules thereby attaching two PEG groups per amino group. The PEG groups attached to the PE molecules thereby form a bubble containing PE and the solution in which the reaction was performed. The bubbles containing PEG-coated PE molecules may then be extracted into a dyeing solvent. The dyeing solvent may include, for example, an organic or non-polar solvent. The organic or non-polar solvent may include any appropriate solvent known in the art that can be used to swell microspheres such that the bubbles can be incorporated therein. Any other suitable methods for attaching PEG groups to proteins or other relatively small organic molecules known in the art may be used in the methods described herein.

Other strategies can be used in the method embodiments described herein to attach hydrophilic polymers containing chemical groups such as PEG to the surface of proteins to form a bubble that facilitates incorporation of the protein into the polymer of microspheres. For example, squarates and semisquarates can be used as bifunctional linkers to connect PEG groups to proteins as shown below.

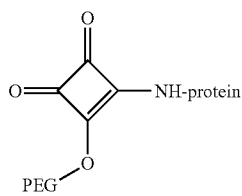

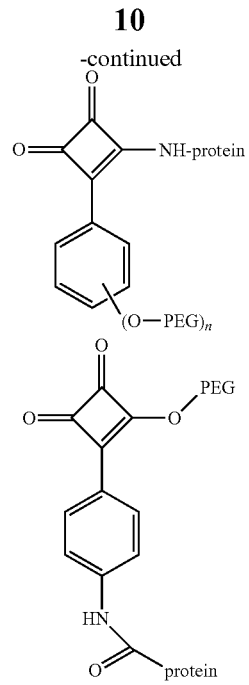

$n = 1-3$

In addition, dendrimers (e.g., Starburst dendrimers) that are commercially available from Sigma-Aldrich Chemical Company, Saint Louis, Mo., may be used to encapsulate protein dyes. In another example, non-ionic detergents like Pluronic (that has a general formula of HO-[CH$_2$CH$_2$O]$_n$—[CH(CH$_3$)—CH$_2$O]$_n$—[CH$_2$CH$_2$O]$_n$—H) have been used as efficient delivery systems for drugs as described by, for example, Alakhov, V. Y. et al., *Bioconj. Chem.*, 1996, Vol. 7, pp, 209-216, which is incorporated by reference as if fully set forth herein. Pluronic compounds having poly(ethylene oxide)-polypropylene oxide) block copolymers have been shown to possess properties as dispersion stabilizers and form stable complexes with hydrophobic surfaces, as described by Li, J. T. et al., *Bioconjugate Chem.*, 1996, Vol. 7, pp, 592-599, which is incorporated by reference as if fully set forth herein. Pluronic surfactants containing a hydrazide functionality (which could be coupled to a protein surface) are commercially available from BASF Corporation, Ludwigshafen, Germany. In yet another example, trichloro triazine can be reacted with three equivalents of PEG polymer. Each terminal hydroxy moiety is then activated with 1-1'-carbonyldiimidazole (CDI) in dioxane. Amino groups on a protein will react with the activated hydroxide groups to produce a protein with attached PEG chains. PEG reagents with reactive end groups as described by Roberts, M. J. et al., *Advanced Drug Delivery Reviews*, 2002, Vol. 54, pp 459-476, which is incorporated by reference as if fully set forth herein, are commercially available (e.g., from Nektar Therapeutics, San Carlos, Calif.) and could also be used to construct a bubble around a hydrophilic dye. Any of the molecules described above or described in the above references may be used to form a bubble as described herein.

If PE is attached to (or "coated with") PEG groups, the dye may be sufficiently stabilized by the PEG groups and aqueous solution contained therein to survive a dyeing process (e.g., without being decomposed by the solvents used in the dyeing process and retaining the fluorescence emission characteristics of the dye when trapped inside a microsphere) even for dyeing processes that use organic dyeing solvents. In addition, the bubbles described herein have a size that is appropriate for incorporation into microspheres having currently used or typical sizes. For example, quantum dots have a size of approximately 10 nm to approximately 30 nm. See, for example, http://www.qdots.com/live/render/content.asp?id=83, which is published by Quantum Dots Corporation (QDC), Hayward, Calif. PE functionalized with PEG groups (R-PE) as described above may have a size of approximately 20 nm. For example, an x-ray crystal structure of R-PE in the protein data bank (#1eyx) gives the size of the unit cell as 18.7 nm×18.7 nm×0.6 nm. (Contreras-Martel, C. et al., *Acta Crystallogr., Sect. D,* 2001, Vol. 57, pp. 52-60, incorporated by reference as if fully set forth herein). Therefore, R-PE has approximately the same size as quantum dots. As such, the bubbles described herein may have a size of about 20 nm and a size approximately equal to that of quantum dots.

Quantum dots have been successfully incorporated into polymeric microspheres. For example, quantum dots (Q-dots) have been incorporated into polymeric microspheres using swelling and de-swelling procedures. Examples of such procedures are illustrated in "Quantum-Dot-Tagged Microbeads for Multiplexed Optical Coding of Biomolecules," Han, M.-Y. et al., *Nature Biotechnology,* 2001, Vol. 19, pp. 631-635, which is incorporated by reference as if fully set forth herein. Therefore, since quantum dots and R-PE have approximately the same size, and since quantum dots have been successfully incorporated into microspheres, the incorporation of R-PE into the polymer core of microspheres should not be inhibited or limited by the size of the R-PE.

If smaller proteins are desired, fluorescent proteins (referred to as "cryptolight dyes") with MWs less than 50,000, which are commercially available from Martek Biosciences Corporation, Columbia, Md., can be used in the methods described herein. In general, the hydrophilic dye may have a lateral dimension of about 1 nm to about 50 nm. The lateral dimension may be a diameter, a length, a width, etc.

The microsphere may be formed of a hydrophobic polymer. For example, the microsphere may be formed of polystyrene crosslinked with divinyl benzene. However, the microsphere may be formed of any suitable hydrophobic polymer known in the art. Incorporation of hydrophilic fluorescent dyes or pigments in substrates like polystyrene is restricted due to their solubility and stability in organic solvents. Incorporation into the various "bubble" structures described above allows these dyes or pigments to be impregnated into microspheres using techniques known in the art previously reserved for hydrophobic materials. One known method is to disperse the dye in organic solvent or a solvent that contains an organic solvent, which swells the microsphere, allowing the dye to enter the interior of the microsphere. The organic solvent is selected such that the microsphere will swell, but not dissolve, when in the organic solvent. A related method substitutes supercritical carbon dioxide fluid for the organic solvent as described by M. Z. Yates et al., *Langmuir,* 2000, 16, 4757-4760 (and references cited therein), which is incorporated by reference as if fully set forth herein. Another method involves a layer-by-layer approach. In this approach, the dye is attached to the surface of a microsphere, and then in a second step an additional layer of polymer is formed over the dye layer.

The bubble may also be disposed in the organic solvent with the microsphere to be dyed. Since the hydrophilic dye will be substantially protected by the enclosure formed by the chemical groups and the aqueous solution contained within the enclosure, the hydrophilic dye will not be contacted by the organic solvent. As such, the hydrophilic dye will not be adversely affected by (e.g., emission characteristics of the dye such as fluorescence wavelength and/or fluorescence intensity will not be altered) or destroyed by the organic solvent. Due to the swelling of the microsphere, the bubble will migrate into the polymer core and may be trapped in the microsphere by de-swelling of the microsphere thereby producing a dyed microsphere. Examples of dyeing procedures that involve swelling of microspheres are illustrated in U.S. Pat. No. 6,514,295 to Chandler et al., which is incorporated by reference as if set forth herein. Incorporation of the bubble into the microsphere may be performed using any of the methods described in this patent.

Figure 3:
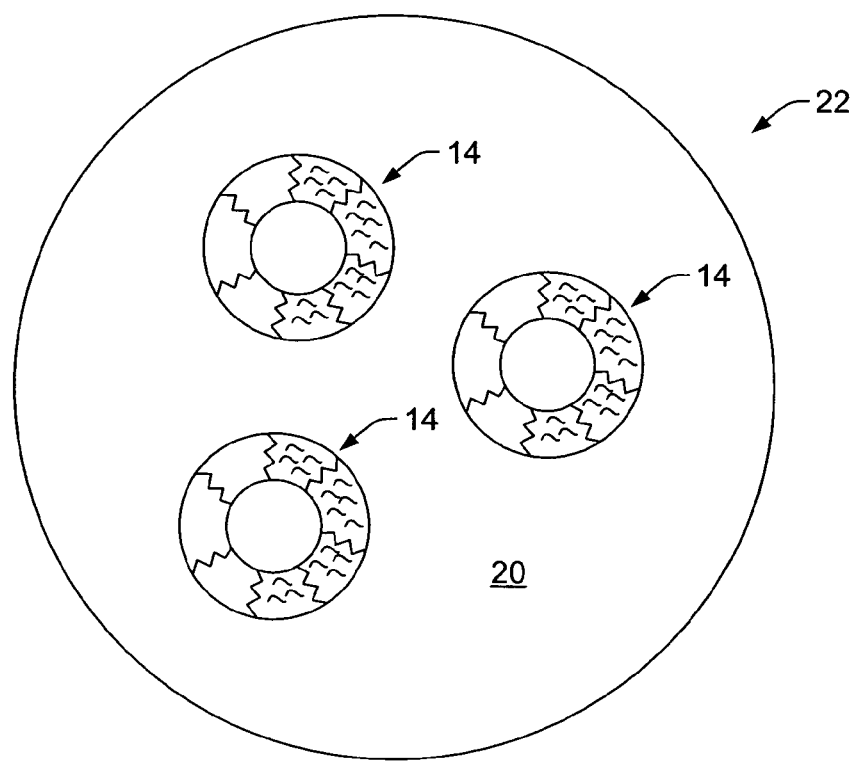
FIG. 3 is a schematic diagram illustrating a cross-sectional view of one embodiment of a dyed microsphere in which multiple bubbles are incorporated into the microsphere.

FIG. 3 illustrates one embodiment of a dyed microsphere formed according to the method embodiments described above. As shown in FIG. 3, bubbles 14 are incorporated into polymer core 20 of microsphere 22. The term "polymer core" as used herein refers to the portion of the microsphere that is formed primarily of polymer. For example, functional groups (not shown) may be attached to the surface of the polymer core such that biomolecules or other molecules (e.g., drug candidates) can be attached to the microsphere via these functional groups. The polymer core may be formed of any of the hydrophobic polymers described herein. Although the polymer core of the microsphere is shown in FIG. 3 to have a spherical shape, it is to be understood that the shape of the polymer core may not be perfectly spherical and may have any other shape known in the art.

Preferably, as shown in FIG. 3, the bubbles may be completely surrounded by the polymer core. In this manner, exposure of the bubbles to buffers and other chemicals in which the microsphere may be disposed (e.g., during an assay, another experiment, or synthesis of a biomolecule such as a nucleotide on the surface of the microsphere) that may be harmful to the hydrophilic dye contained within the bubbles may be reduced, and even eliminated, by the combination of the aqueous solution in the bubble, the chemical groups forming the enclosure of the bubble, and the polymer of the polymer core. Therefore, the shelf life of the microspheres will not be limited by degradation of the hydrophilic dye. As such, microspheres dyed using the methods described herein should have substantially longer shelf lives than microspheres dyed with hydrophilic dyes using other dyeing methods.

As further shown in FIG. 3, the bubbles have substantially the same characteristics as the non-incorporated bubbles shown in FIG. 1. However, upon incorporation into the polymer core, de-swelling of the polymer core may exert a force upon the bubble. The force exerted on the bubble may be sufficient to "squeeze" the bubble thereby possibly altering its shape from that shown in FIG. 1. However, the force exerted on the bubble should not be large enough to fracture the attachments between the chemical groups and the hydrophilic dye. Therefore, the bubbles may be incorporated into the polymer core largely intact. As such, contact between the hydrophilic dye and the polymer core may be substantially eliminated as well thereby largely reducing the possibility that one or more characteristics of the hydrophilic dye may be adversely affected by the hydrophobicity of the polymer or any other components contained within the polymer core.

Figure 2:
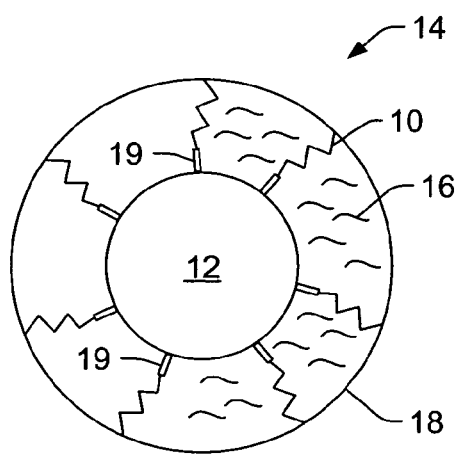

Although the bubbles shown in FIG. 3 incorporated into the polymer core of the microsphere are bubbles as shown in FIG. 1, it is to be understood that the bubble shown in FIG. 2 may be similarly incorporated into the microsphere. Although 3 bubbles are shown in FIG. 3 incorporated into the polymer core, it is to be understood that the number of bubbles that are included in the polymer core may vary greatly depending on, for example, characteristics of the bubbles, characteristics of the microsphere, and parameters (i.e., conditions) of the dyeing process such as solvent characteristics, temperature, etc. In addition, the number of bubbles incorporated into the microsphere may be controlled by selecting one or more parameters of the dyeing process. Selection of appropriate parameters of the dyeing process for a particular dye and microsphere combination can be performed by experimentation using the disclosure provided herein as a guide.

Preferably, within one subset of microspheres, the amount of dye incorporated into each microsphere may be approximately equal. In other words, assuming that each bubble contains approximately the same amount of dye, the number of bubbles incorporated into the polymer core of each microsphere of a subset may be substantially equal. Of course, different amounts of different dyes may be incorporated into a microsphere by incorporating bubbles containing the different hydrophilic dyes in different amounts. Preferably, however, the microspheres of a subset include the same amount of each dye used to impart distinguishable characteristics to the microspheres. In this manner, the microspheres in one subset may have substantially the same fluorescent characteristics (intensity at one or more wavelengths, etc.). Furthermore, the microspheres of a subset formed according to the method embodiments described herein may have emission characteristics resulting from the hydrophilic dye(s) incorporated into the microspheres that exhibit a substantially low % coefficient of variation (% CV). The dyed microsphere shown in FIG. 3 may be further configured and/or formed as described further herein.

A population of microspheres may include several (i.e., two or more) such subsets of microspheres. Each subset may be distinguishable from other subsets of the population by their fluorescent characteristics. In other words, different subsets of microspheres may be dyed with different fluorescent dyes, different amounts of one or more fluorescent dyes, and/or different concentrations of one or more fluorescent dyes. As such, different subsets of a population can have different fluorescent signatures (e.g., different fluorescent wavelength(s), different fluorescent intensities, etc.) that can be measured and used by a measurement system such as those described herein to determine the subset that individual microspheres belong to (i.e., to classify microspheres according to subset).

In addition to the above described method for incorporation of a hydrophilic dye containing bubble into a microsphere that involves swelling microspheres, coupling of PE and/or PE-like dyes to microspheres can be achieved by adsorption of a PE layer (e.g., more than one PE dye molecule and not necessarily a continuous layer of PE dye molecules) on the surface of polymer (e.g. polystyrene) cores. This adsorption is followed by forming a shell of another material surrounding the polymer core and the PE molecules adsorbed thereon to substantially enclose the PE layer. The outer shell may preferably contain functional groups that would allow the microsphere to be dispersible in water.

In one embodiment, a method for forming a dyed microsphere includes adsorbing a hydrophilic dye on a surface of a hydrophobic polymer core of a microsphere to be dyed thereby dyeing the microsphere. This method also includes attaching chemical groups to the hydrophilic dye. The chemical groups are soluble in aqueous and organic solvents. The chemical groups attached to the hydrophilic dye form an enclosure surrounding the hydrophilic dye and an aqueous solution.

Figure 4:
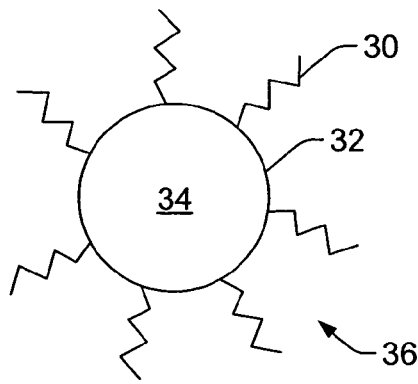
FIG. 4 is a schematic diagram illustrating a cross-sectional view of one embodiment of a hydrophilic dye adsorbed on a surface of a hydrophobic polymer core of a microsphere to be dyed.

In one such method embodiment, as shown in FIG. 4, hydrophilic dye 30 is adsorbed on surface 32 of hydrophobic polymer core 34 of microsphere 36. The hydrophilic dye may include PE or any other hydrophilic dye described herein. The hydrophobic polymer core may be formed of any of the hydrophobic polymers described herein. In addition, the polymer core of the microsphere may be further configured as described above. The hydrophilic dye may be adsorbed on the surface of the hydrophobic polymer core using any appropriate method known in the art. For example, the method may include treating the surface of the un-dyed microsphere to facilitate adsorption of the hydrophilic dye on the surface (e.g., by increasing the "wettability" of the surface to hydrophilic dye molecules and hydrophilic solutions or solvents) of the hydrophobic polymer core. Since such adsorption does not involve swelling of the microspheres as described above, the adsorption may be performed in the presence of an aqueous, or non-organic, solvent. Therefore, the hydrophilic dye will not be adversely affected (e.g., one or more emission characteristics of the hydrophilic dye will not be altered) or destroyed during adsorption since the dye is not exposed to an organic solvent.

The hydrophilic dye may be adsorbed on the surface of the hydrophobic polymer core via one or more functional groups (not shown) attached to the surface of the hydrophobic polymer core. The one or more functional groups may include any appropriate functional groups known in the art. The functional groups may also facilitate dispersion of the microspheres in an aqueous solvent or solution. Although a certain number of hydrophilic dye molecules are shown adsorbed on the surface of the hydrophobic polymer core in FIG. 4, it is to be understood that the number of hydrophilic dye molecules adsorbed on the hydrophobic polymer core may vary greatly depending on, for example, characteristics of the hydrophobic polymer core, characteristics of the hydrophilic dye molecules, and parameters (i.e., conditions) of the adsorption step such as solvent characteristics, temperature, etc. In addition, the number of hydrophilic dye molecules adsorbed onto the surface may be controlled by selecting one or more parameters of the dyeing process. Selection of appropriate parameters of the dyeing process for a particular dye and microsphere combination can be performed by experimentation using the disclosure provided herein as a guide.

Preferably, the amount of dye adsorbed onto the hydrophobic polymer core of microspheres within a subset may be approximately equal. In addition, the amount of each different hydrophilic dye adsorbed onto the surface of the hydrophobic polymer core of each microsphere within a subset is preferably substantially equal. Microspheres of different subsets in a population may include different amounts, concentrations, etc. of one or more hydrophilic dyes adsorbed on the surface of the hydrophobic polymer cores.

If the microsphere shown in FIG. 4 is used in microsphere-based applications, the hydrophilic dye molecules adsorbed on the surface of the hydrophobic polymer core will be exposed to one or more solvents or solutions during further processing of the microsphere (e.g., biomolecules synthesis) and/or measurements performed using the microsphere. Therefore, the hydrophilic dye molecules may be damaged and/or one or more emission characteristics of the dyes (e.g., wavelength and intensity) may be altered by contact with certain buffers and possibly other chemicals. As such, if the microsphere shown in FIG. 4 were to be used for measurements or in certain process steps performed on microspheres, the fluorescent emission characteristics of the microsphere may be altered or eliminated. In addition, the fluorescent emission characteristics of the microsphere may be altered dramatically over time thereby decreasing the stability of the dyed microsphere. The stability of the hydrophilic dye adsorbed on the surface of the hydrophobic polymer core may, therefore, reduce the shelf life of the microsphere.

Figure 5:
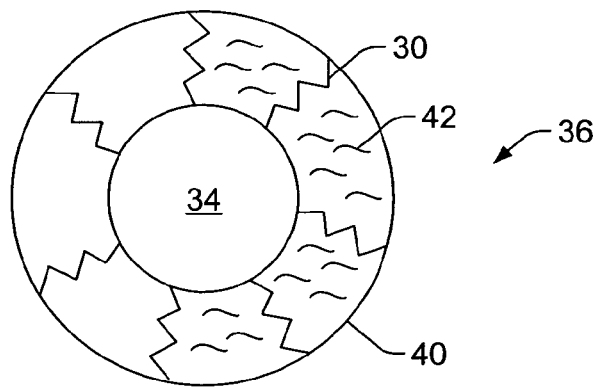
FIG. 5 is a schematic diagram illustrating a cross-sectional view of one embodiment of chemical groups attached to the hydrophilic dye of FIG. 4.
Figure 6:
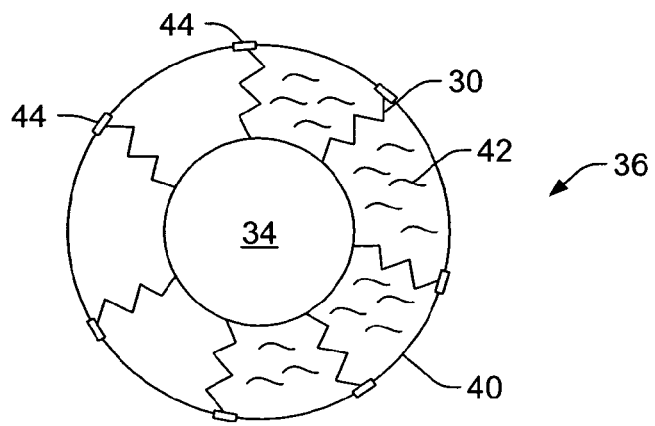
FIG. 6 is a schematic diagram illustrating a cross-sectional view of another embodiment of chemical groups attached to the hydrophilic dye of FIG. 4 by additional chemical groups.

To avoid these drawbacks, the hydrophilic dye adsorbed on the surface of the polymer core may be protected from buffers and other chemicals and conditions using the chemical groups described above. For example, as shown in FIG. 5, chemical groups 40 are attached to hydrophilic dye molecules 30. Chemical groups 40 are selected such that upon attachment of the chemical groups to the dye the chemical groups form an enclosure surrounding the hydrophilic dye and aqueous solution 42. Therefore, the composite structure shown in FIG. 5 is much like the bubble shown in FIG. 1 except that the hydrophobic polymer core of the microsphere is also contained within the bubble. An additional layer of polymer can be formed on top of the bubble to separate it from the surrounding solution using techniques known in the art. The enclosure may be further configured as described above. In some embodiments, the chemical groups may be attached to the hydrophilic dye by additional chemical groups 44 as shown in FIG. 6. The additional chemical groups may include a triazine or another such chemical group. The microsphere shown in FIG. 6 may be further configured as described herein. The aqueous solution may consist essentially of water and/or any other suitable aqueous solution described above or known in the art. Preferably, the aqueous solution is substantially inert with respect to the hydrophilic dye as described further above.

The chemical groups are soluble in aqueous and organic solvents. In other words, the chemical groups may include any suitable amphipathic or amphiphilic chemical groups known in the art such as PEG groups. The hydrophilic portion of the chemical groups may be attached to the hydrophilic dye, and the hydrophobic portion of the chemical groups may be spaced from the hydrophilic dye by the hydrophilic portion.

The chemical groups may include one or more functional groups (not shown). In this manner, the chemical groups may include one or more functional groups prior to attachment of the chemical groups to the hydrophilic dye. Alternatively, one or more functional groups may be coupled to the chemical groups after the chemical groups have been attached to the hydrophilic dye. The one or more functional groups may extend at least partially beyond the enclosure formed by the chemical groups or are otherwise available on the surface of the enclosure for further reactions. The one or more functional groups may be used to synthesize or attach biomolecules or any other suitable molecules (e.g., drug candidates) to the microsphere. In addition, since the chemical groups and the aqueous solution will substantially protect the hydrophilic dye, the microsphere may be disposed in an organic solvent such that a biomolecule may be synthesized on the microsphere using the one or more functional groups of the chemical groups. The one or more functional groups may include any suitable functional groups known in the art. The dyed microspheres shown in FIGS. 4-6 may be further configured and/or formed as described herein.

Although method embodiments are described herein with respect to dyeing one microsphere, it is to be understood that the methods may be used to dye multiple microspheres simultaneously (e.g., in the same dyeing step(s)). In addition, although the methods are described herein with respect to dyeing a microsphere with one hydrophilic dye, it is to be understood that the methods may include dyeing the microsphere with more than one dye substantially simultaneously or sequentially. The multiple dyes may include at least one hydrophilic dye (e.g., more than one hydrophilic dye, one or more hydrophilic dyes and one or more hydrophobic dyes, etc.). Furthermore, at least one hydrophilic dye may be incorporated into the microspheres via a bubble, and one or more other dyes may be coupled to the microsphere in any other manner (e.g., a hydrophobic dye may be attached to the surface of the microspheres in the methods described herein). In addition, one hydrophilic dye may be attached to the surface of a hydrophobic polymer core of a microsphere and may be surrounded by chemical groups as described above, and a different hydrophilic dye may be incorporated into the microsphere via a bubble as described further above. In such an example, one or more hydrophilic dyes may be incorporated into the microsphere and/or one or more hydrophobic dyes may be incorporated into the microsphere. In a different such example, only hydrophobic dyes may be incorporated into the microsphere, and one or more hydrophilic dyes may be attached to the surface of the hydrophobic polymer core and surrounded by chemical groups that form an enclosure. Obviously, therefore, a relatively large number of dye combinations are possible in the embodiments described herein and include some combination of one or more hydrophobic dyes incorporated into the polymer core, one or more hydrophobic dyes attached to the surface of the polymer core, one or more hydrophilic dyes incorporated into the polymer core via bubbles, and one or more hydrophilic dyes attached to the polymer core and protected by chemical groups.

Figure 7:
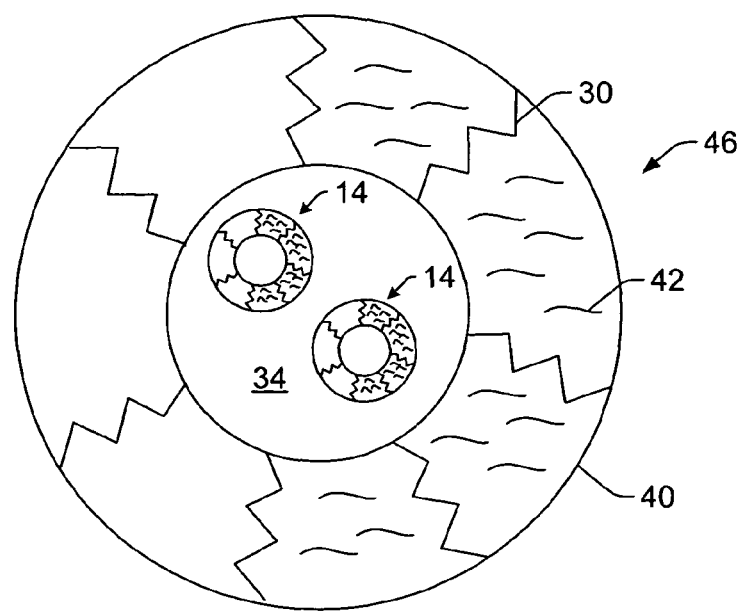
FIG. 7 is a schematic diagram illustrating a cross-sectional view of one embodiment of a dyed microsphere in which multiple bubbles are incorporated into the microsphere and chemical groups are attached to a hydrophilic dye adsorbed on a surface of a hydrophobic polymer core of the microsphere thereby forming an enclosure surrounding the hydrophilic dye and an aqueous solution.

One embodiment of a dyed microsphere in which at least one hydrophilic dye is incorporated into the microsphere via a bubble and at least one hydrophilic dye is attached to the surface of the hydrophobic polymer core of the microsphere and surrounded by chemical groups that form an enclosure is shown in FIG. 7. In particular, dyed microsphere 46 includes bubbles 14. Bubbles 14 may be configured as described above. For example, bubbles 14 may be formed by attaching chemical groups to a hydrophilic dye as shown in FIGS. 1 and 2. Bubbles 14 include the chemical groups surrounding the hydrophilic dye and an aqueous solution. The chemical groups are soluble in aqueous and organic solvents. Bubbles 14 are incorporated into polymer core 34 of microsphere 46. In addition, hydrophilic dye 30 is adsorbed on a surface of hydrophobic polymer core 34 of microsphere 46. Hydrophilic dye 30 and the hydrophilic dye in bubbles 14 may be different hydrophilic dyes. Chemical groups 40 attached to hydrophilic dye 30 are soluble in aqueous and organic solvents. Chemical groups 40 attached to hydrophilic dye 30 from an enclosure surrounding hydrophilic dye 30 and aqueous solution 42. Chemical groups 40 and chemical groups of bubbles 14 may be the same or different.

The dyed microsphere and each of the components of the dyed microsphere shown in FIG. 7 may be further configured as described herein. For instance, although a particular number of bubbles 14 and molecules of hydrophilic dye 30 are shown in FIG. 7, it is to be understood that any appropriate number of bubbles may be incorporated into the polymer core of the microsphere, and any appropriate number of hydrophilic dye molecules may be adsorbed on the surface of the hydrophobic polymer core of the microsphere. The hydrophilic dye molecules incorporated into the polymer core of the microsphere via bubbles may be different than the hydrophilic dye molecules adsorbed onto the surface of the hydrophobic polymer core of the microsphere. Furthermore, more than one hydrophilic dye may be incorporated into the polymer core of the microsphere via bubbles. In addition or alternatively, molecules of more than one hydrophilic dye may be adsorbed onto the surface of the hydrophobic polymer core of the microsphere. The microsphere may also include hydrophobic dye molecules incorporated into the polymer core of the microsphere and/or attached to the surface of the hydrophobic polymer core of the microsphere.

The microsphere shown in FIG. 7 is, therefore, dyed by two or more dyes, each of which imparts at least one distinguishing measurable characteristic to the microsphere. The two or more dyes may be coupled to the microsphere by incorporation or surface attachment in different amounts, different concentrations, different ratios, etc. Preferably, microspheres in a subset, each of which may be configured as shown in FIG. 7, include substantially the same amount, substantially the same concentration, etc. of the two or more dyes. Microspheres in different subsets of a population, each of which may be configured as shown in FIG. 7, preferably include different amounts, different concentrations, etc., or some combination thereof of the two or more dyes. The microsphere shown in FIG. 7 may be further configured and formed as described herein.

Hydrophobic dyes may be coupled to the microsphere in methods similar to those described herein possibly with one or more different parameters or conditions selected based on the hydrophobic dyes. For example, since the bubbles may be incorporated into the microsphere using an organic dyeing solvent, one or more hydrophobic dyes and the bubbles may be incorporated into the microsphere substantially simultaneously (e.g., in the same dyeing step). Alternatively, since hydrophilic dye molecules are preferably attached to a surface of a polymer core using an aqueous solvent, hydrophobic and hydrophilic dyes may be coupled to the surface of the polymer core in different dyeing steps with appropriate changes in the dyeing solvent between the steps. A particular dyeing procedure involving both hydrophilic and hydrophobic dyes may be determined by one of ordinary skill in the art based on the dyes and the characteristics of the dyes.

Each of the microsphere embodiments described herein may further include one or more additional components such as quantum dots, magnetic components, or any other component that can be used to identify or distinguish microspheres belonging to different subsets. Such components may be incorporated into or coupled to the microspheres using any appropriate method known in the art.

Generally, in fluorescence applications (such as applications in which systems that are commercially available from Luminex Corporation, Austin, Tex. are used), the best results (e.g., the most accurate results) are obtained when the dye or dyes used in the actual measurements and the dye or dyes used in the calibration and control reagents are the same. This matching of the dyes for different functions is commonly referred to as "spectral matching." Spectral matching is advantageous in that problems with machine-to-machine variability could be sharply reduced if the reporter channel is calibrated with PE instead of the dye currently being used. In one embodiment, dyed microspheres formed by attaching PE to the surface of the microspheres according to the method embodiments described herein may be used, not only as sample beads (i.e., beads on which measurements for an experiment are performed), but also as calibration and control beads. In another embodiment, dyed microspheres formed by incorporating PE into the microspheres according to the embodiments described herein may be used as sample beads and calibration and control beads.

The drawbacks of using a surface bound dye is that one or more characteristics of the dye may be affected by changes in the buffer solution in which the microspheres are disposed (changes in intensity and/or wavelength are possible). The shelf stability of the PE may be longer when the PE is protected inside the microsphere as compared to PE coupled to the surface. In addition, the % CV of the fluorescent signal is higher for PE coupled to the surface of a microsphere (about 20% to about 30% when Luminex supplied Lumavidin microspheres are coupled to a biotin-PE conjugate) than Luminex supplied CAL2 microspheres (<8% CV). Microspheres similar to CAL2 microspheres can be produced by the methods described in U.S. Pat. No. 6,599,331 to Chandler et al., which is incorporated by reference as if fully set forth herein.

Internally dyed PE beads formed according to the method embodiments described herein may also be used as calibration, control, or validation beads for the Luminex system and other flow cytometer-like systems. These beads may also be used by various users of such systems as internal controls in their own assays. The beads may also be used instead of other calibration microspheres such as QuantiBRITE™ PE, which are commercially available from BD Biosciences, San Jose, Calif., (which include PE attached to the surface of microspheres) for other flow instruments (such as those described in U.S. Pat. No. 5,093,234 to Schwartz et al., which is incorporated by reference as if fully set forth herein). The National Institute of Standards and Technology (NIST) is also currently exploring PE associated microspheres with the goal of producing a new standard as described by Schwartz et al., *Cytometry Part B (Clinical Cytometry)*, 57 B, 1-6, 2004, which is incorporated by reference as if fully set forth herein. Therefore, the beads formed according to the method embodiments described herein may be used as such a standard.

The following examples are not to be construed as limiting embodiments of the invention and are included herein for example purposes only.

Example 1

Incorporation of PE into Microspheres Using PEG-5000

To 10 mg of dried 5.6 μm carboxylated, crosslinked polystyrene microspheres in a 1.5 mL microcentrifuge tube was added 0.5 mL of PEG-5000 (obtained from Sigma-Aldrich, Saint Louis, Mo.), and the mixture was rotated overnight. To the mixture was added 20 μL of a 1 mg/mL solution of streptavidin, R-PE conjugate (obtained from Molecular Probes, Inc., Eugene, Oreg.), and the mixture was rotated for 30 minutes. After addition of 1 mL of deionized water, the mixture was centrifuged until the microspheres formed a pellet in the bottom of the tube. The liquid was decanted, 1 mL of water was added, and the centrifugation process was repeated. The now pink colored microspheres were then taken up in phosphate buffered saline (PBS) solution and tested with the Luminex 100 system that is commercially available from Luminex. The reporter channel reported 310 mfi counts.

Example 2

Incorporation of PE into Microspheres Using Triton X-100

A solution was prepared from 2 mL of dimethylformamide, 2 mL of deionized water and 40 μL of Triton X-100 (obtained from Sigma-Aldrich). To 80 μL of this solution in a 1.5 mL microcentrifuge tube was added 20 μL of a 1 mg/mL solution of streptavidin, R-PE conjugate (obtained from Molecular Probes). This solution was added to 10 mg of 5.6 μm carboxylated, crosslinked polystyrene microspheres swollen with dimethylformamide and placed in a shaker stirrer for 30 minutes. The microspheres were washed with deionized water two times and tested with the Luminex 100 instrument. The reporter channel reported 112 mfi counts.

Example 3

Modification of PE with PEG Chains

To 500 μL of standard 0.01 M phosphate buffered saline was added 2.3 mg of MPEG-500-SH (thiol terminated polyethylene glycol chain with a molecular weight of 5000 Daltons, which is commercially available from Nektar Therapeutics, San Carlos, Calif.), and the solution mixed. A 250 μL aliquot of a 10.3 mg/mL solution of Phycolink® succinimidyl 4-[N-maleimidomethyl]-cyclohexane-1-carboxylate (SMCC) solution (R-phycoerythrin with active maleimide functionality, which is commercially available from Prozyme Inc., San Leandro, Calif.) was then added, and the resulting solution was mixed, stored at 4° C. for 72 hours, and lyophilized.

Example 4

Incorporation of PEG Modified PE onto Microspheres

Figure 8:
FIG. 8 is a fluorescent, confocal image of microspheres dyed with PE using the method embodiments described herein.

To 10 mg of dried 5.6 μm carboxylated, crosslinked polystyrene microspheres in a 1.5 mL centrifuge tube was added a solution prepared from 0.3 mg of PEG-PE (prepared in Example 3), 10 μL of D.I. water and 500 μL of an appropriate organic solvent (e.g. chloroform). The microspheres were dispersed by vortex stirring and sonication. After five minutes, the mixture was centrifuged until the microspheres formed a pellet in the bottom of the tube. The liquid was decanted, 1 mL of 2-propanol was added, and the mixing and centrifugation process was repeated. The microspheres were washed three more times (as above) with PBS solution and tested with the Luminex 100 instrument. The reporter channel of the Luminex 100 instrument reported 800 mfi counts. The fluorescent image shown in FIG. 8 of the dyed microspheres was obtained with a confocal microscope using a 40×0.95 lens (the z-resolution is approximately 1 micron).

Figure 9:
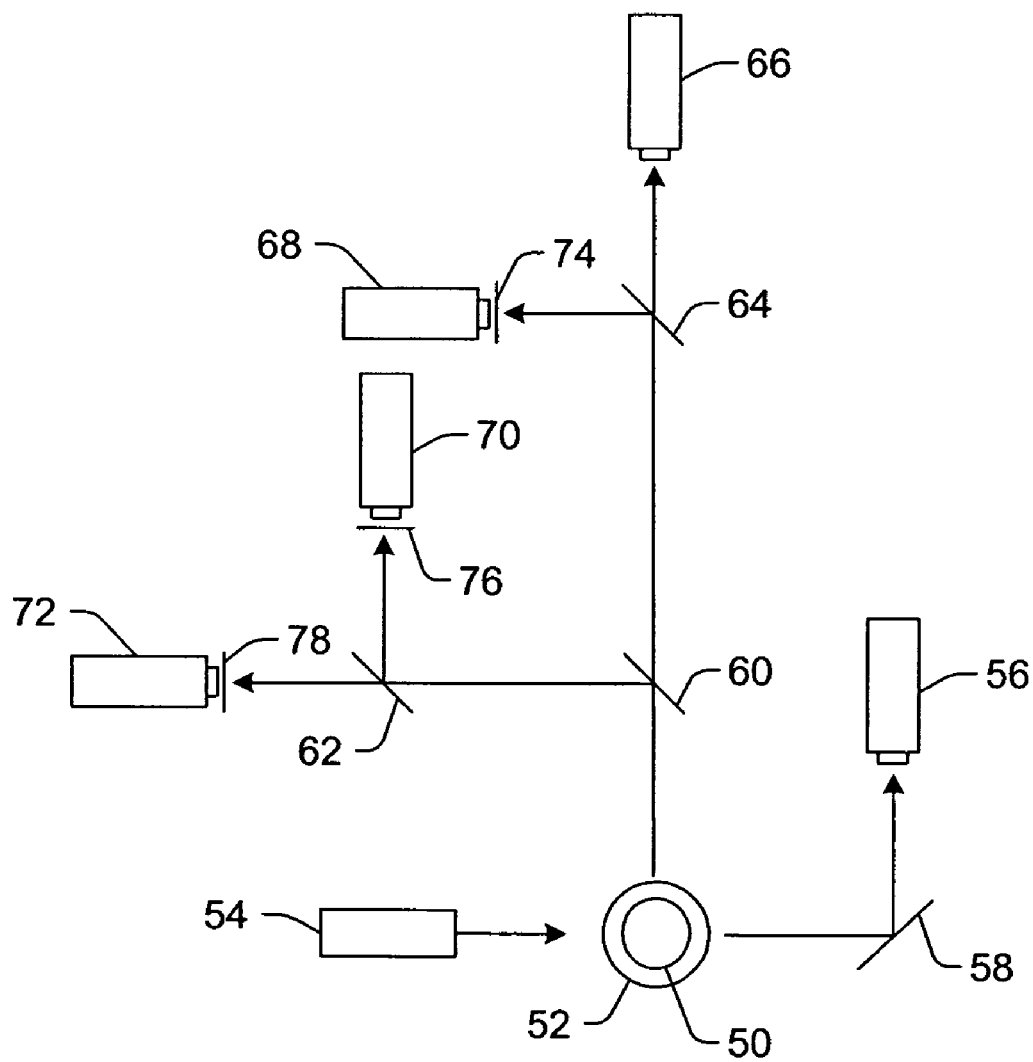
FIG. 9 is a schematic diagram illustrating one example of a measurement system that may be used to perform experiments using microspheres dyed according to the method embodiments described herein.

Turning back to the drawings, FIG. 9 illustrates one example of a measurement system that may be used to perform experiments with the dyed microspheres described herein. It is noted that FIG. 9 is not drawn to scale. In particular, the scale of some of the elements of the figure is greatly exaggerated to emphasize characteristics of the elements. Some elements of the measurement system such as a digital signal processor (DSP) have not been included in the figure for the sake of clarity.

In FIG. 9, the measurement system is shown along a plane through the cross-section of cuvette 52 through which microspheres 50 flow. In one example, the cuvette may be a standard quartz cuvette such as that used in standard flow cytometers. Any other suitable type of viewing or delivery chamber, however, may also be used to deliver the sample for analysis. Microspheres 50 may include any of the dyed microsphere embodiments described herein.

The measurement system includes light source 54. Light source 54 may include any appropriate light source known in the art such as a laser. The light source may be configured to emit light having one or more wavelengths such as blue light or green light. Light source 54 may be configured to illuminate the microspheres as they flow through the cuvette. The illumination may cause the microspheres to emit fluorescent light having one or more wavelengths or wavelength bands. In some embodiments, the system may include one or more lenses (not shown) configured to focus light from the light source onto the microspheres or the flowpath. The system may also include more than one light source. In one embodiment, the light sources may be configured to illuminate the microspheres with light having different wavelengths (e.g., blue light and green light). In some embodiments, the light sources may be configured to illuminate the microspheres at different directions.

Light scattered forwardly from the microspheres may be directed to detection system 56 by folding mirror 58 or another such light directing component. Alternatively, detection system 56 may be placed directly in the path of the forwardly scattered light. In this manner, the folding mirror or other light directing components may not be included in the system. In one embodiment, the forwardly scattered light may be light scattered by the microspheres at an angle of about 180 degrees from the direction of illumination by light source 54, as shown in FIG. 9. The angle of the forwardly scattered light may not be exactly 180 degrees from the direction of illumination by the light source such that incident light from the light source may not impinge upon the photosensitive surface of the detection system. For example, the forwardly scattered light may be light scattered by the microspheres at angles less than or greater than 180 degrees from the direction of illumination (e.g., light scattered at an angle of about 170 degrees, about 175 degrees, about 185 degrees, or about 190 degrees).

Light scattered and/or emitted by the microspheres at an angle of about 90 degrees from the direction of illumination by the light source may also be collected. In one embodiment, this scattered light may be separated into more than one beam of light by one or more beamsplitters or dichroic mirrors. For example, light scattered at an angle of about 90 degrees to the direction of illumination may be separated into two different beams of light by beamsplitter 60. The two different beams of light may be separated again by beamsplitters 62 and 64 to produce four different beams of light. Each of the beams of light may be directed to a different detection system, which may include one or more detectors. For example, one of the four beams of light may be directed to detection system 66. Detection system 66 may be configured to detect light scattered by the microspheres.

The other three beams of light may be directed to detection systems 68, 70, and 72, respectively. Detection systems 68, 70, and 72 may be configured to detect fluorescence emitted by the microspheres. Each of the detection systems may be configured to detect fluorescence of a different wavelength or a different range of wavelengths. For example, one of the detection systems may be configured to detect green fluorescence. Another of the detection systems may be configured to detect yellow-orange fluorescence, and the other detection system may be configured to detect red fluorescence.

In some embodiments, spectral filters 74, 76, and 78 may be coupled to detection systems 68, 70, and 72, respectively. The spectral filters may be configured to block fluorescence of wavelengths other than that which the detection systems are configured to detect. In addition, one or more lenses (not shown) may be optically coupled to each of the detection systems. The lenses may be configured to focus the scattered light or emitted fluorescence onto a photosensitive surface of the detectors.

The detector's output current is proportional to the fluorescent light impinging on it and results in a current pulse. The current pulse may be converted to a voltage pulse, low pass filtered, and then digitized by an A/D converter. A DSP integrates the area under the pulse to provide a number which represents the magnitude of the fluorescence.

In some embodiments, the output signals generated from fluorescence emitted by the microspheres may be processed to determine an identity of the microspheres and information about a reaction taking place on the surface of the microspheres. For example, two of the output signals may be used to determine an identity of the microspheres, and the other output signals may be used to determine a reaction taken or taking place on the surface of the microspheres.

Although the system of FIG. 9 is shown to include two detection systems having two different detection windows for distinguishing between microspheres having different dye characteristics, it is to be understood that the system may include more than two such detection windows (i.e., 3 detection windows, 4 detection windows, etc.). In such embodiments, the system may include additional beamsplitters and additional detection systems having other detection windows. The detection windows for more than two detection systems may be determined as described above. In addition, spectral filters and/or lenses may be coupled to each of the additional detection systems.

In another embodiment, the system may include two or more detection systems configured to distinguish between different materials that have reacted with reactants on the surface of the microspheres. The different materials may have dye characteristics that are different than the dye characteristics of the microspheres.

Additional examples of measurement systems that may be used to perform measurements on the dyed microsphere embodiments described herein are illustrated in U.S. Pat. Nos. 5,981,180 to Chandler et al., 6,046,807 to Chandler, 6,139,800 to Chandler, 6,366,354 B1 to Chandler, 6,411,904 B1 to Chandler, 6,449,562 B1 to Chandler et al., and 6,524,793 B1 to Chandler et al., which are incorporated by reference as if fully set forth herein. The measurement system described herein and shown in FIG. 9 may also be further configured as described in these patents. In addition, the assays and experiments in which the dyed microsphere embodiments described herein may be used include any of the assays and experiments described in these patents and any other assays and experiments known in the art.

It will be appreciated to those skilled in the art having the benefit of this disclosure that this invention is believed to provide methods for forming dyed microspheres and populations of microspheres. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for forming a dyed microsphere, comprising:
    attaching a hydrophilic dye to chemical groups to form a bubble, wherein the bubble comprises the chemical groups surrounding the hydrophilic dye and an aqueous solution, and wherein the chemical groups are soluble in aqueous and organic solvents; and
    disposing the bubble and a microsphere to be dyed in a solvent such that the bubble is incorporated into the microsphere thereby dyeing the microsphere.

2. The method of claim 1, wherein the hydrophilic dye comprises phycoerythrin.

3. The method of claim 1, wherein the hydrophilic dye has a lateral dimension of about 1 nm to about 50 nm.

4. The method of claim 1, wherein the hydrophilic dye comprises a protein.

5. The method of claim 1, wherein the hydrophilic dye comprises an organic dye.

6. The method of claim 1, wherein the chemical groups comprise polyethylene glycol groups.

7. The method of claim 1, wherein the chemical groups are attached to the hydrophilic dye by an additional chemical group.

8. The method of claim 1, wherein the aqueous solution consists essentially of water.

9. The method of claim 1, wherein the microsphere is formed of a hydrophobic polymer.

10. A dyed microsphere, comprising chemical groups attached to a hydrophilic dye to form a bubble, wherein the bubble comprises the chemical groups surrounding the hydrophilic dye and an aqueous solution, wherein the chemical groups are soluble in aqueous and organic solvents, and wherein the bubble is incorporated into a polymer core of the microsphere.

11. The microsphere of claim 10, wherein the hydrophilic dye comprises phycoerythrin.

12. The microsphere of claim 10, wherein the hydrophilic dye has a lateral dimension of about 1 nm to about 50 nm.

13. The microsphere of claim 10, wherein the hydrophilic dye comprises a protein.

14. The microsphere of claim 10, wherein the hydrophilic dye comprises an organic dye.

15. The microsphere of claim 10, wherein the chemical groups comprise polyethylene glycol groups.

16. The microsphere of claim 10, wherein the chemical groups are attached to the hydrophilic dye by an additional chemical group.

17. The microsphere of claim 10, wherein the aqueous solution consists essentially of water.

18. The microsphere of claim 10, wherein the polymer core is formed of a hydrophobic polymer.

19. The method of claim 1, further comprising disposing a hydrophobic dye into the solvent such that the hydrophobic dye is incorporated into the microsphere at the same time the bubble is incorporated into the microsphere.

20. The microsphere of claim 10, further comprising another hydrophilic dye attached to a surface of the microsphere.

21. The microsphere of claim 20, further comprising additional chemical groups attached to the other hydrophilic dye, wherein the additional chemical groups are soluble in aqueous and organic solvents, and wherein the additional chemical groups attached to the other hydrophilic dye form an enclosure surrounding the other hydrophilic dye, another aqueous solution and the polymer core of the microsphere.

* * * * *